United States Patent [19]

Fain, Jr.

[11] Patent Number: 4,858,642

[45] Date of Patent: Aug. 22, 1989

[54] IMPACT RESISTANT PRESSURE RELIEF VALVE

[75] Inventor: John E. Fain, Jr., Pineville, La.

[73] Assignee: Dresser Industries, Inc., Dallas, Tex.

[21] Appl. No.: 147,790

[22] Filed: Jan. 25, 1988

[51] Int. Cl.⁴ .............................................. F16K 17/04
[52] U.S. Cl. ..................................... 137/474; 137/904
[58] Field of Search ........................ 137/469, 747, 904

[56] References Cited

U.S. PATENT DOCUMENTS

| | | |
|---|---|---|
| 353,995 | 12/1886 | Walker et al. |
| 587,704 | 8/1897 | Clayton . |
| 2,088,666 | 8/1937 | Portl . |
| 2,247,773 | 7/1941 | Dunn . |
| 2,517,858 | 8/1950 | Farris .................................. 137/469 |
| 2,643,090 | 6/1953 | Cluphf . |
| 3,872,875 | 3/1975 | Raidl .................................. 137/469 X |

FOREIGN PATENT DOCUMENTS

| 813229 | 2/1937 | France .................................. 137/474 |
|---|---|---|

OTHER PUBLICATIONS

Catalog SRV-1 "Consolidated(R) Safety Relief Valves", (1984) Sections 1 and 2.

Primary Examiner—Alan Cohan

[57] ABSTRACT

An impact resistant pressure operated relief valve comprising a valve body having an exhaust port and a nozzle assembly having a flow passage which terminates in an opening surrounded by an annular valve seat. A disc holder in the valve body is slidably disposed between a closed position abuting the valve seat, thus closing the nozzle passage and a second position in which the disc holder is displaced from the valve seat, thus opening the valve port to the nozzle passage. A compression spring forces the disc holder to the normally closed position. The lower portion of the disc holder is provided with a valve disc having a facing surface which is adapted to contact the valve seat in the closed position. The invention further comprises compressible shock absorber means interposed between the disc and the disc holder. The shock absorber functions to lessen the shock forces involved when the valve disc impacts upon the valve seat at closing. This permits the use of a narrow valve seat which provides a high unit load on between the disc and the valve seat and achieves a high degree of seat tightness.

16 Claims, 2 Drawing Sheets

IMPACT RESISTANT PRESSURE RELIEF VALVE

TECHNICAL FIELD

This invention relates to pressure relief valves and more particularly to impact resistant high pressure relief valves.

BACKGROUND

Pressure relief valves are used in many industrial applications to prevent plant operating systems from reaching dangerously high pressures. Such valves include a nozzle assembly having a valve seat which is normally closed by a valve member slidably disposed in the body of the valve. The valve member typically is biased in the closed position against the valve seat by a compression spring, by fluid pressure, or both. With the valve in the closed position, when the pressure in the nozzle passage exceeds a predetermined set value, the valve member "pops" open and places the nozzle passage in fluid communication with an exhaust port in the valve body. When the pressure in the nozzle passage decreases by a specified incremental amount, termed the blowdown differential or simply "blowdown", to arrive at the reseating pressure for the valve, the valve member is again seated on the valve seat to close the valve.

Ideally, the set point (the pressure at which the valve opens), the blowdown and the reseating pressure should be controlled to close tolerances in order to ensure the safety of personnel and equipment in the vicinity of the high pressure plant operation. The blowdown pressure differential can be regulated by means of a secondary annular orifice defined by means of a valve member skirt surrounding an adjustment ring on the nozzle assembly. For a given set pressure, the blowdown can be increased by moving the adjustment ring upward in the direction of the valve member, thus decreasing the cross sectional area of the secondary annular orifice.

Another important consideration is seat tightness in order to minimize valve leakage, particularly at pressures approaching the set pressure of the valve. Seat tightness can be defined in terms of the relationship between the set pressure of the valve and the pressure, expressed as a percentage of the set pressure, at which the valve first begins to leak. Seat tightness can be improved by providing highly machined surfaces between the valve seat and the closure face of the valve member. In order to provide such a high quality valve surface, it is a conventional practice to face the valve member with a highly machined replaceable disc formed of stainless steel or like material. The disc is secured in the valve member or "disc holder" by means of a "disc retainer" e.g. a split ring secured in a groove in a disc stem and resting against internal shoulder within the disc holder.

As noted previously, valve leakage can be minimized by precision machining of the contacting surfaces of the valve seat and the valve member disc. Thus, the contacting surfaces of high quality valves are machined to a surface finish of less than three microinches in order to achieve positive valve seating. Valve leakage can also be reduced by employing valve seats of a relatively narrow width which offer a small contact area with the disc member. Valves having a narrow valve seat are more precise in their operating characteristics than valves having wider seats and can provide a high degree of seat tightness. However, the use of narrow seat valves is limited by the forces involved in valve opening and closing, particularly in a valves designed for high pressure operations. As a practical matter such high pressure valves, valves designed to operate at set pressures of 1000 psi or above, require valve seats having a width in excess of 0.8 mm., and it is not uncommon for such minimum seat widths to range up to 0.1 inch or above, i.e., well above 2.0 mm.

One technique for achieving seat tightness in high pressure valves involves the use of a so-called "soft seat" valve configuration. In this design, a resilient seal is provided by means of an O-ring secured in the disc holder by means of a disc shaped O-ring retainer. The conforming surfaces of the valve seat of the nozzle and the O-ring retainer are beveled with the valve seat projecting outwardly from the retainer periphery so that the metal to metal surfaces of the retainer and the valve seat bear the load imposed upon the disc holder. At the same time, contact between the outer edge of the valve seat in the O-ring provides the valve sealing function.

Pressure relief valves of the type described above are disclosed in Dresser Industries Inc.'s Catalog SRV-1 "Consolidated ® Safety Relief Valves" (1984), Sections 1 and 2. Soft seat valves are particularly disclosed in Section 2, pages 13–15.

SUMMARY OF THE INVENTION

In accordance with the present invention, there is provided a new pressure operated relief valve which provides a high degree of seat tightness characteristic of soft seat valves but with the metal to metal sealing function of a hard seat valve providing a high degree of durability. The pressure operated relief valve of the present invention comprises a valve body having an exhaust port and a nozzle assembly extending into the valve body. The nozzle assembly has a flow passage which terminates in an opening exposed to the interior of the valve body. An annular valve seat is formed around the nozzle opening. A disc holder is slidably disposed in the valve body between a closed position abutting the valve seat, thus preventing fluid communication between the nozzle passage and the exhaust port, and a second position in which the disc holder is displaced from the valve seat, thus opening the valve port to the nozzle passage. Suitable means such as a compression spring or the like functions to bias the disc holder toward the closed position. The lower portion of the disc holder is provided with a valve disc having a facing surface which is adapted to contact the valve seat. The invention further comprises compressible shock absorber means interposed between the disc and the disc holder. The shock absorber means functions to lessen the shock forces involved when the valve disc impacts upon the valve seat at closing.

The configuration involving the shock absorber means and annular valve seat permits the use of a narrow valve seat, thus providing a high unit load between the disc and the valve seat and achieving a high degree of seat tightness. Thus, the valve seat width can be no more than 0.8 mm. below the width normally encountered in metal to metal valve seats. Preferably the width of the valve seat will be within the range of about 0.4–0.6 mm. The valve seat width normally should be greater than 0.3 mm in order to ensure sufficient seat strength even notwithstanding the use of the compressible shock absorber means.

In one embodiment of the invention the valve disc is provided with a passage extending between the rear and the front face of the valve disc. The passage terminates at the facing surface in an enlarged recess. Fastening means having an enlarged shoulder section which is set in the recess extends through the passage and is connected to the disc holder behind the valve disc in order to hold the valve disc in place against the compressible shock absorber means. Preferably, when the valve is in the closed position the surface area of the disc is greater than the surface area of the nozzle opening. When the valve is in the closed position a substantial portion of the force due to the pressure within the nozzle is transmitted directly to the disc holder rather than through the shock absorber means.

In yet a further embodiment of the invention the valve disc provides an integral facing surface exposed to the nozzle opening. The valve disc is secured to the valve holder by means of a rearwardly extending pedestal which is interconnected with the disc holder to permit relative rearward movement of the valve disc relative to the disc holder against the compressible shock absorber means.

DETAILED DESCRIPTION OF THE INVENTION

Figure 1:
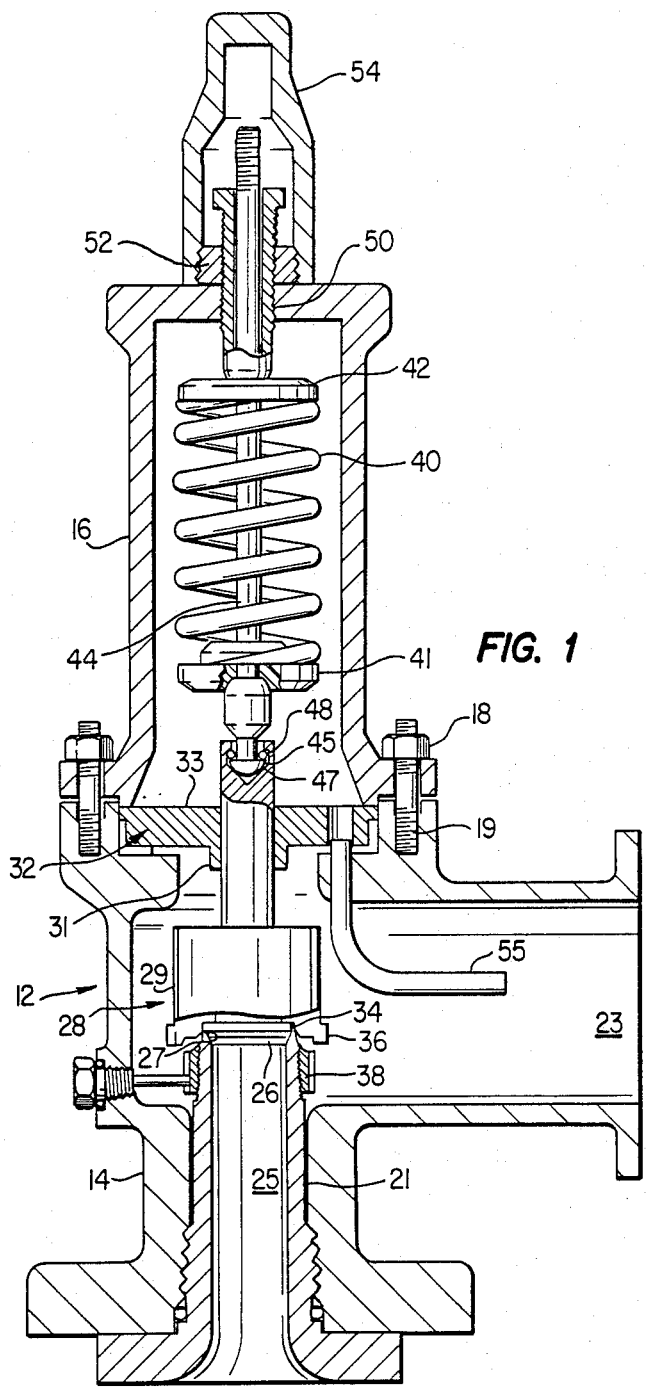
FIG. 1 is a side elevational view, partly in section, illustrating a pressure operated release valve embodying the present invention.

Referring initially to FIG. 1 there is illustrated a valve comprising a valve body 12 formed of a base component 14 and a bonnet component 16 which is secured to the base by means of nuts and studs 18 and 19. The valve body is provided with a nozzle assembly 21 which provides an inlet to the valve body and an exhaust port 23 through which fluids may be expelled when the valve is in the open position. A passage 25 through the nozzle assembly terminates in an enlarged opening 26 in valve seat 27 which, when the valve is in the closed position as shown, is closed by valve member 28. Valve member 28 comprises a disc holder 29 which is secured in and slidably disposed within the guide way 31 of guide assembly 32. The guide assembly includes a transverse mounting plate 33 held in place between the base and bonnet components. The disc holder supports a disc 34 having a machined face which rests upon the valve seat 27. Disc holder 29 is provided with an annular skirt 36. Skirt 36 projects downwardly from the disc holder in conjunction with an adjustment ring 38 on the nozzle assembly provides a secondary orifice for regulating the blowdown pressure of the valve.

The valve member 28 is biased downwardly to the closed position by means of a compression spring 40 interposed between washers 41 and 42 which are slidably mounted on the shank of a spindle 44. Spindle 44 is provided at the bottom with an enlarged spindle head 45 which is seated in a recess 47 at the upper end of the disc holder and is retained therein by means of a split retaining ring 48. The lower washer 41 rests upon the shoulder provided on the spindle, and the upper washer 42 is limited in upward movement by the bottom shoulder of an adjusting screw 50 which is threaded within the top plate of the bonnet component 16. It will be recognized that the compresive force exerted by compression spring 40 can be adjusted by moving the adjustment screw up or down. Screw 50 is held at the desired position by means of an adjusting screw nut 52. The upper end of the assembly is provided with a cap 54 to cover the adjustment screw and the threaded upper end of the spindle shank.

The guide assembly plate 33 is provided with an eductor tube 55 which extends from the bonnet area into the passage leading to the exhaust port. The eductor tube functions to reduce pressure within the bonnet area due to leakage of fluid past the guide surfaces when the valve is in the open position. Fluid flow through the outlet port acts to impose a syphon effect on the eductor tube to withdraw fluid from the bonnet area.

The valve components as described thus far are conventional and are exemplary of a typical valve configuration in which the present invention can be utilized. However, it will be recognized that other valve configurations to which the invention is applicable are known to those skilled in the art. For example, the bonnet area may be sealed off from fluids by means of bellows located around the upper portion of the disc holder, thus eliminating the need for an eductor tube. Reference is made to Sections 1 and 2 of the aforementioned Dresser Industries, Inc. Catalog SRV-1 for a further description of various valve configurations with respect to which the present invention can be utilized.

Figure 2:
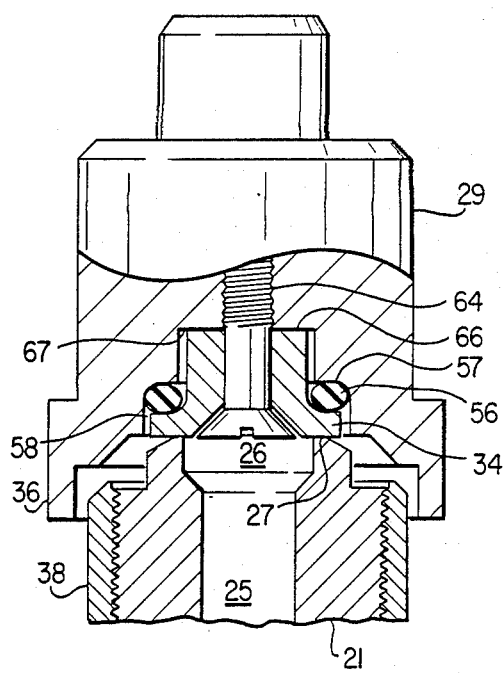
FIG. 2 is a side elevational view partly in section, showing details of the nozzle assembly, disc and disc holder in one embodiment of the invention.

Turning now to FIG. 2, there is illustrated an enlarged view, partly in section illustrating details of the nozzle assembly and corresponding valve member employed in one embodiment of the present invention. In FIG. 2, an annular shock absorber 56 is interposed between a forward facing internal shoulder 57 in the disc holder 29 and a rearward facing shoulder 58 formed on the back of the disc 34. Shock absorber 56 may be formed of a any suitable compressible resilient material capable of absorbing shock forces imposed upon the face of the disc when the valve closes. By way of example the shock absorber may take the form of a standard rubber O-ring. The operating face of the disc is provided with an enlarged recess which in the embodiment shown is tapered to accommodate the conforming surface of the head of a set screw 62. Screw 62 extends through a central passage in disc 34 and is threadedly secured within a threaded hole 64 in the disc retainer. The flared surface of the head of set screw 62 holds the disc against downward movement but it will accommodate rearward movement of the disc against the compressible shock absorber. Such rearward movement however is limited by the back portion of the disc 66 which ultimately will abut against the forward facing shoulder 67 in the disc holder.

The nozzle passage 25 is enlarged at its upper end thereby increasing the valve member area exposed to the fluid pressure and increasing the force on the valve member. This enables the use of a greater spring force, thus improving the "popping" characteristics of the valve as it opens. With the valve in the closed position illustrated in FIG. 2, the force imposed by the high pressure fluid at nozzle opening 26 is transmitted to the disc holder through the valve disc 34. The full force resulting from the pressure upon the disc is not transferred to the shock absorber in the closed position.

With the valve in the closed position, leakage past the interface between the screw 62 and the bore within the valve disc imposes a back pressure upon the shock absorber element. So long as the valve remains closed, a pressure gradient will thus be established across the shock absorber element which will function as a seal in addition to performing a shock absorber function.

When the valve is closed during normal operation as shown in FIG. 2 the shoulder 67 of the disc holder rests on the shoulder 66 of the disc. The screw 62 will move with the disc holder relative to the disc and thus the screw head will project slightly out of the recess in the face of the disc holder. The inlet fluid pressure acting against the seating surfaces is opposed by the spring force exerted by the compression spring 40. The force of the spring 40 which acts to hold the disc 34 on the valve seat 27 is transmitted through the disc holder and the shock absorber element 56. As the inlet pressure in nozzle passage 25 increases above the operating pressure for the system, the pressure in the nozzle tends to equalize the spring force, and the forces holding the valve seating surfaces together approach zero. At this point a prior art safety relief valve will ten to audibly relieve the fluid medium past the seating surfaces, resulting in a condition commonly referred to as "simmer." Once the simmering condition is reached, a higher inlet pressure is required to achieve the set point of the valve and cause it to "pop."

The present invention minimizes and in most cases actually eliminates the simmer. The "spring force" due to the resiliency of the shock absorber element 56 interacts with the spring force imposed by the compression spring 40 to hold the valve disc tight against the valve seat at pressures very near to the set point of the valve. For example, where a conventional valve might begin to show leakage at about 90% of the set point, a valve configured in accordance with the present invention can be expected to retain a seat tightness even after several "pops" of up to about 98% of the set pressure.

Once the valve does pop open, the secondary annular orifice is created by the skirt portion 36 of the disc holder and the adjustment ring 38. The effective cross-sectional area of the secondary annular orifice can be regulated similarly as in the case of prior art valves by threadedly adjusting ring 38 up or down on the nozzle assembly. As the pressure increases in the secondary orifice area, the disc 34 and disc holder are forced into a degree of lift allowing the valve to accomplish full capacity flow.

Figure 3:
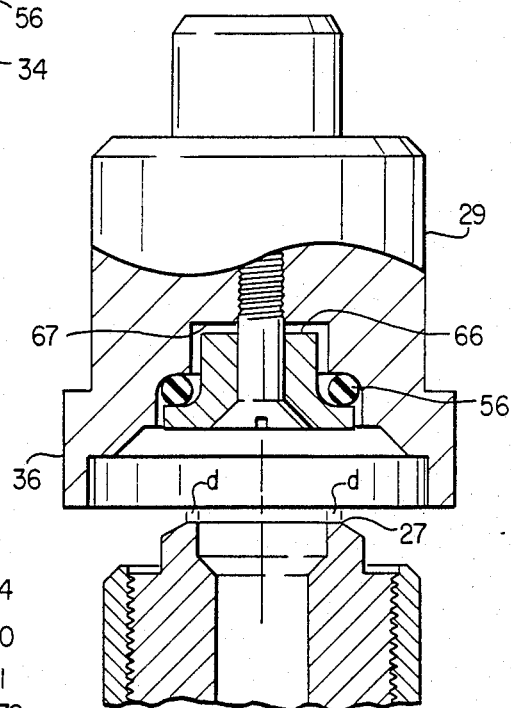
FIG. 3 is a side elevational view partly in section showing the assembly of FIG. 2 with the valve in the open position.

FIG. 3 illustrates the assembly of FIG. 2 in the open position after the valve has popped open. As explained previously, the blowdown pressure differential, and thus the reseat pressure can be regulated by adjustment of the ring 38 to define a desired cross sectional area of the secondary orifice. When the pressure reduces to the reseating point the valve will close rapidly under the action of the compression spring 40. The shock forces imposed upon the valve seat and the valve disc are reduced by the function of the shock absorber element. In addition, the design of the secondary annular orifice in such that as the valve begin to close, the effective cross-sectional area of the secondary orifice decreases to provide a cushioning effect upon the valve closure. This effect also acts together with the shock absorber to reduce some of the hammering force at the valve seat. The shock absorber enables the width of the valve seat, as indicated by dimension "d" in FIG. 3, to be configured to a very narrow dimension which tends to promote a high unit load upon the valve seat and provide for a tight seat between the valve seat and the active face of the disc 34.

Typically for a valve designed to operate at pressures above 1000 psi the seat width is above 0.8 mm. In the present invention the dimension "d" can be configured to a value of less than 0.8 mm. A preferred value for dimension "d" is within the range of 0.4–0.6 mm.

Figure 4:
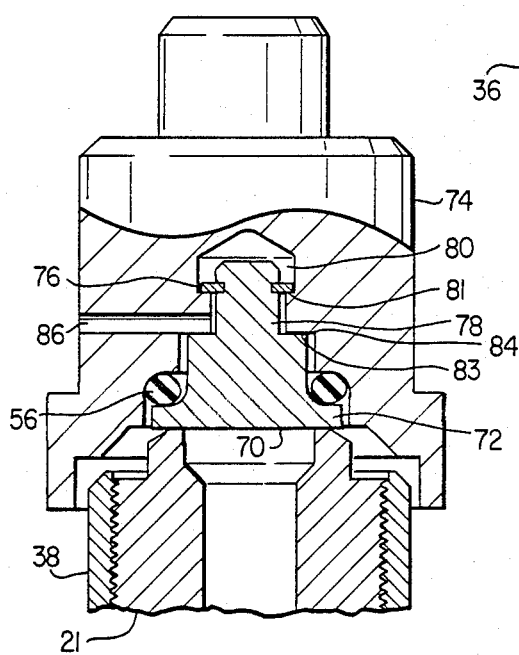
FIG. 4 is a side elevational view partly in section showing details of another embodiment of the invention.

FIG. 4 illustrates an alternative embodiment of the invention having a modified disc and disc holder which is useful where it is desired to removed the shock absorber means from contact with the fluid medium when the valve is in the normal closed position. As shown in FIG. 4, the face 70 of the valve disc 72 is an integral surface so that, with the valve in the closed position, shock absorber element 56 is not exposed to the fluid medium. In this case the disc is retained within disc holder 74 by means of a split ring 76 secured within a groove 77 within the rearwardly extending pedestal 78 of the disc. An internal bore 80 within the disc holder is provided with a shoulder 81 upon which the retainer abuts preventing displacement of the disc from the disc retainer. As shown in FIG. 4, the disc can move rearward to the extent permitted by the distance between the disc shoulder 83 and disc retainer shoulder 84. In this embodiment the disc retainer is provided with passage 86 through which a drift pin or other appropriate implement can be inserted to bias the disc downwardly and remove it from the disc holder.

Having described specific embodiments of the present invention, it will be understood that modification thereof may be suggested to those skilled in the art, and it is intended to cover all such modifications as fall within the scope of the appended claims.

I claim:

1. In a pressure operated relief valve, the combination comprising:
    (a) a valve body having an exhaust port therein;
    (b) a nozzle assembly in said valve body having a flow passage therein and terminating in an opening in an annular valve seat around said flow passage, said valve seat comprising a surface having a width of less than 0.8 millimeter which is cooperative with and adapted to be contacted by the hereinafter recited planar disc facing surface;
    (c) a disc holder slidably disposed in said valve body between a closed position adjacent said valve seat to close communication between said flow passage and said exhaust port and a second position in which said exhaust port is in fluid communication with said nozzle passage;
    (d) a valve disc secured to said disc holder and having a planar facing surface;
    (e) compressible shock absorber means interposed between said disc and said disc holder; and
    (f) a means for biasing said disc holder in the direction of said valve seat to normally hold said valve disc facing surface against and in contact with the cooperative surface of said valve seat in the closed position.

2. The combination of claim 1 wherein said valve seat has a width within the range of 0.4–0.6 millimeters.

3. The combination of claim 1 wherein said valve disc comprises a central pedestal extending rearwardly from the back surface of said valve disc and defining a back shoulder on said valve disc on which said compressible shock absorber means is mounted.

4. The combination of claim 3 wherein said valve disc has a passage extending through said valve disc and terminating in the facing surface of said valve disc in an enlarged recess and fastening means having an enlarged shoulder section set into said recess and extending through said passage and rigidly connected to said disc holder at the rear of said pedestal in order to hold said valve disc in place against said compressible shock absorber means.

5. The combination of claim 4 further comprising conforming shoulder surfaces on said valve disc pedestal and at the interior of said disc holder to limit rearward movement of said disc relative to said disc holder against the compressive force of said shock absorber means.

6. The combination of claim 3 wherein further comprising means to secure said valve disc to said disc holder by interconnection of said rearwardly extending pedestal with said disc holder to permit slidable rearward movement of said valve disc relative to said disc holder against said compressible shock absorber means.

7. The combination of claim 6 further comprising comforming shoulder surfaces on said valve disc pedestal and at the interior of said disc holder to limit rearward movement of said disc relative to said disc holder against the compressive force of said shock absorber means.

8. In a pressure operated relief valve, the combination comprising:
(a) a valve body having an exhaust port therein;
(b) a nozzle assembly in said valve body having a flow passage therein and terminating in an opening in an annular valve seat around said flow passage, said valve seat comprising a surface having a width of less than 0.8 millimeter which is cooperative with and adapted to be contacted by the hereinafter recited planar disc facing surface;
(c) a disc holder slidably disposed in said valve body between a closed position adjacent said valve seat to close communication between said flow passage and said exhaust port and a second position in which said exhaust port is in fluid communication with said nozzle passage;
(d) a valve disc secured to said disc holder having a planar facing surface adapted to contact said valve seat and a central passage in said valve disc terminating in said facing surface of said valve disc in an enlarged recess;
(e) compressible shock absorber means interposed between said disc and said disc holder;
(f) fastening means having an enlarged shoulder section set into the recess of said valve disc and exposed to said nozzle opening, said fastening means extending through said passage and being rigidly connected to said disc holder at the rear of said valve disc in order to hold said valve disc in place against said compressible shock absorber means; and
(g) a means for biasing said disc holder in the direction of said valve seat to normally hold said valve disc facing surface against and in contact with the cooperative surface of said valve seat in the closed position.

9. The combination of claim 8 wherein said fastening means comprises a set screw extending through said valve disc and threadedly secured to said disc holder, said set screw having a flared head and the recess in said valve disc having a flared surface conforming to the head of said set screw.

10. The combination of claim 8 wherein said disc holder comprises a circumferential skirt member extending downwardly and defining with said nozzle assembly a secondary annular orifice.

11. The combination of claim 10 further comprising an adjusting ring threadedly secured from the external surface of said nozzle assembly to enable changes in the effective cross-section of said secondary annular orifice.

12. The combination of claim 8 wherein the valve seat has a width within the range of 0.4–0.6 millimeters.

13. The combination of claim 8 further comprising conforming shoulder surfaces on said valve disc rearwardly of said shock absorber means and on the interior of said disc holder to limit rearward movement of said disc relative to said disc holder against the compressive force of said shock absorber means.

14. In a pressure operated relief valve, the combination comprising:
(a) a valve body having an exhaust port therein;
(b) a nozzle assembly in said valve body having a flow passage therein and terminating in an opening in an annular valve seat around said flow passage, said valve seat comprising a surface having a width of less than 0.8 millimeter which is cooperative with and adapted to be contacted by the hereinafter recited planar disc facing surface;
(c) a disc holder slidably disposed in said valve body between a closed position adjacent said valve seat to close communication between said flow passage and said exhaust port and a second position in which said valve port is in fluid communication with said nozzle passage;
(d) a valve disc secured to said disc holder having an integral planar facing surface adapted to contact said valve seat, a back central pedestal extending rearwardly from the back surface of said valve disc and defining an annular shoulder surface on the rear of said valve disc;
(e) compressible shock absorber means interposed between the annular shoulder surface of said disc and a corresponding shoulder surface in said disc holder; and
(f) means securing said valve disc to said disc holder by interconnection of said pedestal with said disc holder to permit slidable rearward movement of said valve disc relative to said disc holder against said compressible shock absorber means; and
(g) a means for biasing said disc holder in the direction of said valve seat to normally hold said valve disc facing surface against and in contact with the cooperative surface of said valve seat in the closed position.

15. The combination of claim 14 wherein the valve seat has a width within the range of 0.4–0.6 millimeters.

16. The combination of claim 14 further comprising conforming shoulder surfaces on said valve disc pedestal and at the interior of said disc holder to limit rearward movement of said disc relative to said disc holder against the compressive of said shock absorber means.

* * * * *

UNITED STATES PATENT AND TRADEMARK OFFICE
CERTIFICATE OF CORRECTION

PATENT NO. : 4,858,642
DATED : August 22, 1989
INVENTOR(S) : John E. Fain, Jr.

It is certified that error appears in the above-identified patent and that said Letters Patent is hereby corrected as shown below:

Column 1, line 55, after "against" insert --an--.
Column 2, line 58, after "and" insert --the--.
Column 4, line 57, after "portion of" delete "the".
Column 5, line 25, change "ten" to --tend--.
Column 6, line 13, change "removed" to --remove--.
Column 6, lines 28-29, change "passage 86" to --passages 86--.
Column 8, line 65, after "compressive" insert --force--.

Signed and Sealed this

Twenty-eighth Day of May, 1991

Attest:

HARRY F. MANBECK, JR.

Attesting Officer

Commissioner of Patents and Trademarks